United States Patent
Kasper et al.

(10) Patent No.: US 12,254,094 B2
(45) Date of Patent: Mar. 18, 2025

(54) CYBER SECURITY TESTING FOR INCORRECTLY AUTHORIZED PROGRAMS

(71) Applicant: INTERNATIONAL BUSINESS MACHINES CORPORATION, Armonk, NY (US)

(72) Inventors: Michael Page Kasper, Poughkeepsie, NY (US); Scott Woolley, Poughkeepsie, NY (US); Diane Marie Stamboni, Poughkeepsie, NY (US); Joshua David Steen, Fishkill, NY (US); Roan Dawkins, Staatsburg, NY (US); Eric Rosenfeld, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 17/664,292

(22) Filed: May 20, 2022

(65) Prior Publication Data
US 2023/0376602 A1 Nov. 23, 2023

(51) Int. Cl.
*G06F 21/57* (2013.01)
(52) U.S. Cl.
CPC ...... *G06F 21/577* (2013.01); *G06F 2221/033* (2013.01)
(58) Field of Classification Search
CPC .......................... G06F 21/577; G06F 2221/033
See application file for complete search history.

(56) References Cited

U.S. PATENT DOCUMENTS

| | | | |
|---|---|---|---|
| 8,918,885 B2 | 12/2014 | McClure | |
| 9,213,843 B2 | 12/2015 | Naldurg | |
| 10,380,339 B1* | 8/2019 | Appalaraju | G06F 21/577 |
| 10,915,640 B2 | 2/2021 | Kasper | |
| 11,010,479 B2 | 5/2021 | Childs | |
| 2005/0198520 A1* | 9/2005 | Bardsley | H04L 63/1433 713/189 |
| 2011/0191854 A1 | 8/2011 | Giakouminakis | |

(Continued)

FOREIGN PATENT DOCUMENTS

| | | |
|---|---|---|
| CN | 108804912 B | 11/2018 |
| CN | 110688659 B | 1/2020 |

(Continued)

OTHER PUBLICATIONS

Authorized Program Facility Protection for Access Method Services, 2021. (Year: 2021).*

(Continued)

*Primary Examiner* — Trong H Nguyen
(74) *Attorney, Agent, or Firm* — Stosch Sabo

(57) ABSTRACT

A system and method for identifying authorized job step programs. The process identifies a plurality of job step programs. It then identifies authorized program facility (APF) authorized programs from the plurality of job step programs. An output table of APF authorized program is generated. This table is used to submit at least one batch job using the output table. A list identifying which parameters in a parameter string contain an address for each APF program in the output table is generated. This list is then provided for program testing.

19 Claims, 6 Drawing Sheets

(56) References Cited

U.S. PATENT DOCUMENTS

2013/0212682 A1* 8/2013 McClure .............. G06F 21/577
726/25

FOREIGN PATENT DOCUMENTS

| CN | 113204496 A | | 8/2021 |
|---|---|---|---|
| CN | 114386048 A | * | 4/2022 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

CYBER SECURITY TESTING FOR INCORRECTLY AUTHORIZED PROGRAMS

BACKGROUND

The present disclosure relates to security testing of programs, more specifically to detecting programs that are linked to operate in an elevated state when they should not be.

Authorized program facility (APF) authorized programs on z/OS are programs linked with SETCODE AC(1), and run with elevated privileges when they are invoked as a job step program from an APF authorized library. As a result of this elevated privilege, known as APF authorization within z/OS, the program can use the MODESET service to switch to a supervisor state and system key. This is in contrast to a program that is not AC(1) which cannot make use of the MODESET service to switch to a supervisor state and system key. However, due to software or installation configuration errors, programs are sometimes linked with SETCODE AC(1) that should not have been linked this way. These programs can receive control with unexpected input in an unexpected state if invoked as a job step program. Even programs that expect to receive control this way need to do proper input validation to avoid errors.

SUMMARY

According to embodiments of the present disclosure a method for identifying authorized job step programs is disclosed. The process identifies a plurality of job step programs. It then identifies authorized program facility (APF) authorized programs from the plurality of job step programs. An output table of APF authorized program is generated. In some embodiments, to generate the table the process attempts to determine if data in a parameter string is a pointer instead of a character string. To determine this storage is obtained within the system that is configured to cause a protection exception when read or written to. A portion of the parameter string is set to point to that storage. The APF program is called using the parameter string and if a protection exception occurred, then it is known that that this parameter in the string is a pointer. This table is used to submit at least one batch job using the output table. A list identifying which parameters in a parameter string contain an address for each APF program in the output table is generated. This list is then provided for program testing.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
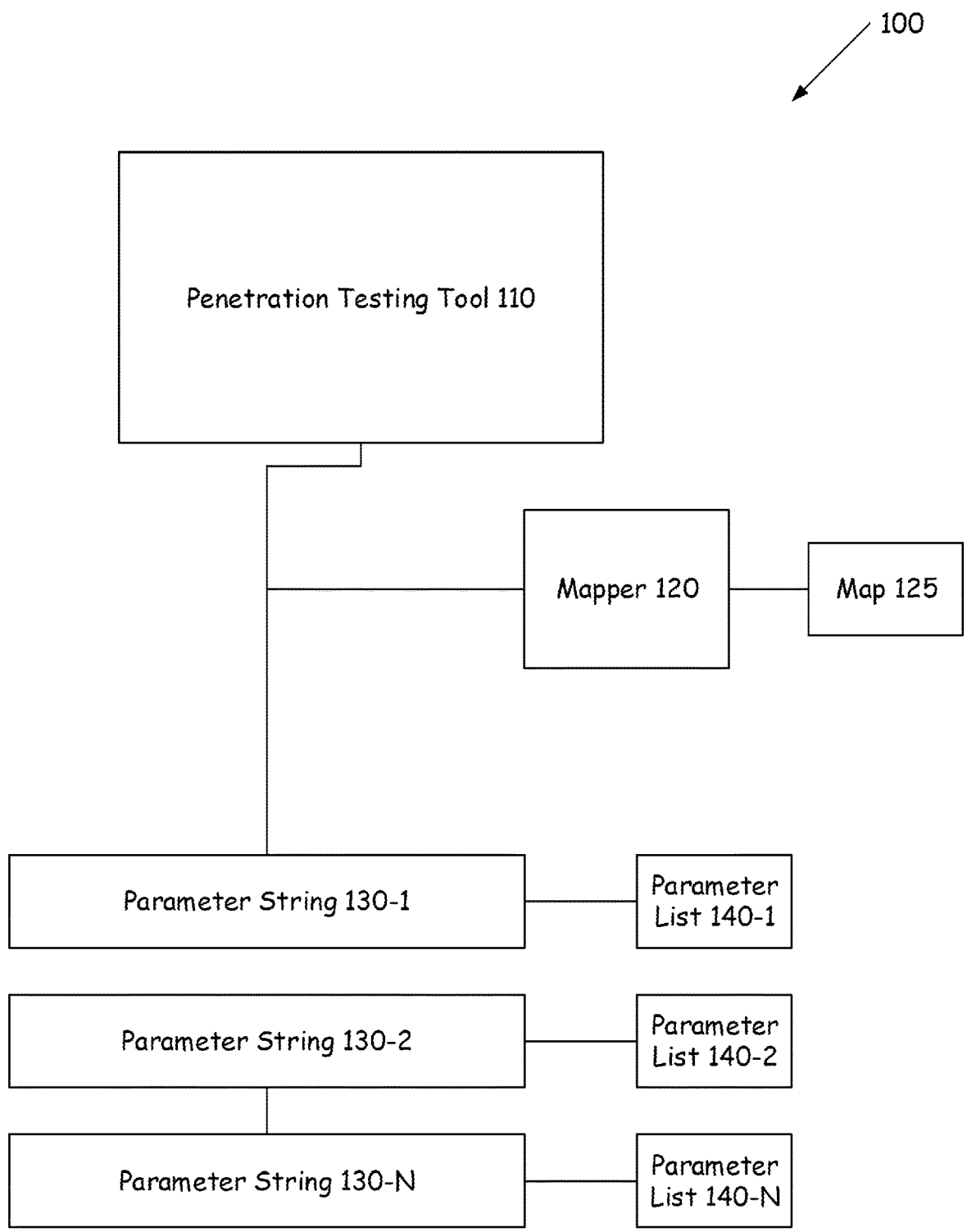
FIG. 1 is a block diagram illustrating system for providing vulnerability detection and analysis according to illustrative embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to security testing of programs, more specifically to detecting programs that are linked to operate in an elevated state when they should not be. While the present disclosure is not necessarily limited to such applications, various aspects of the disclosure may be appreciated through a discussion of various examples using this context.

Authorized program facility (APF) authorized programs on z/OS are programs linked with SETCODE AC(1), and run with elevated privileges when they are invoked as a job step program from an APF authorized library. As a result of this elevated privilege, known as APF authorization within z/OS, the program can use the MODESET service to switch to a supervisor state and system key. This is in contrast to a program that is not AC(1) which cannot make use of the MODESET service to switch to a supervisor state and system key. However, due to software or installation configuration errors, programs are sometimes linked with SETCODE AC(1) that should not have been linked this way. These programs can receive control with unexpected input in an unexpected state if invoked as a job step program. Even programs that expect to receive control this way need to do proper input validation to avoid errors.

Job step programs typically expect a parameter string in a certain format as input. However, programs that do not expect to be called as job step programs do not have such expectation, and, for example, might expect a list of pointers as input instead. This means that program linked AC(1) incorrectly could both be running with elevated privilege and receiving a parameter string from an untrusted source in a format that it did not expect. This can cause the program to treat the input string as a list of pointers, and as a result branch to an unexpected address in an authorized state, overwrite sensitive data, or even reveal sensitive data in resulting messages or system log files. This can happen for various reasons, such as, for example, a misunderstanding of the requirement for when programs need to be linked with SETCODE AC(1) and when they do not, or a failure to realize aliases inherit this attribute. Even programs intended to be AC(1) need to take precautions to avoid branching to an unexpected address, or overwriting or revealing sensitive data. For example, if parameters are copied without checking the length, addresses or data could be overwritten. One way to find these security vulnerabilities is through dynamic testing. The first step is to identify AC(1) programs, the second step is to test if the program is expecting pointers instead of a character string as input, and the third step is to both map and test the parameter list using established techniques to find fetch or store violations or privilege escalations.

While problems in authorized programs can also be found through code inspection or disassembly, the source code is not always available, or efficient to read manually. Further, analyzing the instruction data can be inconclusive or difficult to do in an automated way. Dynamic testing provides conclusive results.

There are several examples of how to use AMBLIST to find AC(1) programs for testing. However, those approaches are not as reliable as using programming interfaces. The present disclosure adds the feature of automatically testing these programs, as well as discovering their parameters lists for further testing. Currently existing approaches for dynamic testing do not include nor have the ability to perform the depth of penetration testing for AC(1) programs disclosed herein, without prior knowledge of the APF authorized programs being tested. The present disclosure provides the ability to detect significantly more vulnerabilities than the currently existing approaches.

Testing tools need to determine meaningful input data to supply to authorized programs being tested. Random data will often return the same results every time without exercising many code paths in the authorized code, because random data does not take advantage of the structures or parts of a parameter list. The request is often rejected for invalid parameters before reaching many sensitive areas of the authorized code paths. For example, parameter lists often contain addresses, or lists of addresses. The length of the address is determined by the addressing mode in use. Determining which parameters contain addresses allows testing programs to provide valid or invalid addresses as input in those parameters. This allows the testing program to provide second, third, or more level parameter lists at those addresses, pointed to by the original parameter list. However, to supply complex and meaningful parameter lists with multiple levels of data and valid pointers, the form and function of the parameter list must be determined or mapped.

While problems in authorized programs can also be found through code inspection or disassembly, the source code is not always available, or efficient to read manually, and analyzing the instruction data can also be inconclusive or difficult to do in an automated way. Dynamic testing provides conclusive results.

FIG. 1 is a block diagram illustrating a testing environment system 100 for testing identifying programs that can operate at an elevated privileged when they should not. System 100 includes a penetration testing tool 110, a mapper 120, at least one parameter string 130-1, 130-2, 130-N (collectively parameter string 130), and at least one parameter list 140-1, 140-2, 140-N (collectively parameter string 140).

Penetration testing tools 110 are testing tools that are configured to find meaningful input to a service without relying on any documentation about the service. The penetration testing tool 110 takes the information provided by the operating system when a protection exception or address translation exception occurs during the processing of the parameter list 140 by the authorized program. The testing tool matches an exception address to an input that was supplied. The testing tool is configured for an unauthorized caller, to determine, parameter by parameter, which parameters contain pointers to other data areas, and which do not. The testing tool uses a testing program configured to determine which parameters likely do not contain pointers. In some embodiments, the testing program can determine which parameters contain numeric function codes, bit flags, or expected constants, instead of addresses. The testing program can indicate a level of confidence in its determination which indicates how likely it is the test program correctly identified a particular parameter.

The mapper 120 is a component of the system that is configured to build a map 125 of a parameter list 140. In some embodiments the mapper 120 is a component of the testing program. However, in some embodiments, the mapper 120 works in conjunction with the testing program. By saving the information determined by the testing program related to the parameters, the mapper 120 builds a map of a parameter list 140 that is used in subsequent targeted testing. The mapper 120 takes the information supplied during a failure to map the parameter list 140 and provide increasingly complex valid parameter lists that can be used by the testing program. The testing program can use these maps in increasingly complex tests. Matching the failing instruction address can also provide meaningful information. If altering values for a parameter causes predictable errors at different instruction addresses, those values could be the cause. The more information that is gained, the more information the mapper 120 can use to build complex parameters for subsequent requests to gain even more information about the parameter list 140 and to test the program.

Figure 2:
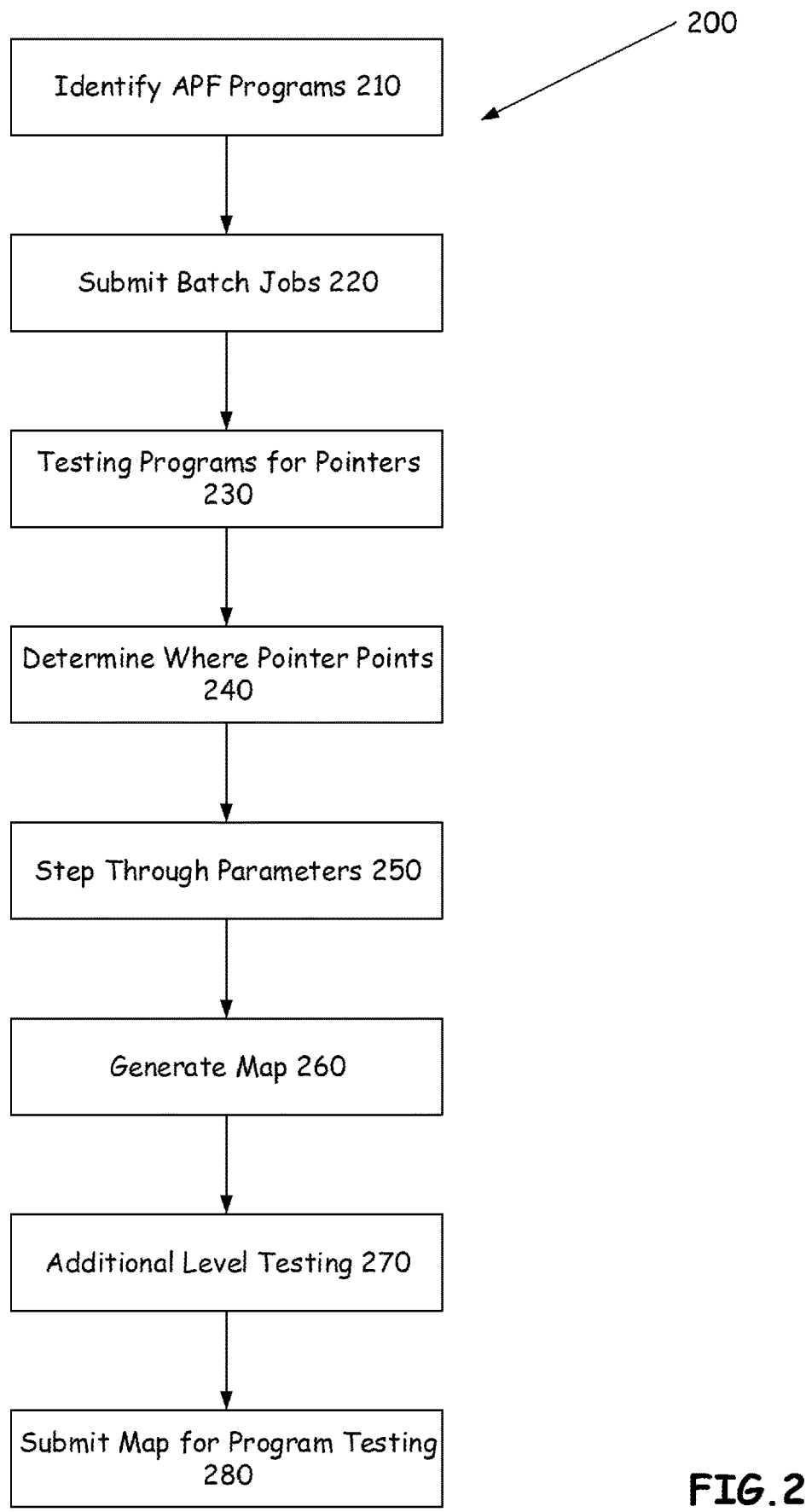
FIG. 2 is a block diagram illustrating the components of the security testing method in further detail according to illustrative embodiments.

FIG. 2 is a flow diagram illustrating a process for testing a program to identify authorized job step programs and map the parameters within them. The first step in the testing process is to identify the APF authorized programs. This is illustrated at step 210. These programs are also known as AC(1) programs. These programs can be shown in MVS with a DISPLAY command or USS with a FIND command.

However both cases require further processing to pare down the list. For MVS programs, first the APF list can be obtained either through a CONSOLE command or a system service like CSVAPF. Next the members of the data set can be examined using a service such as BLDL or reading the directory entries for the partitioned data set or load library to determine which of the programs or aliases in those APF authorized libraries were linked with SETCODE AC(1). The results can be saved to an MVS output table. For USS programs, the FIND command output can provide the list of programs with the APF attribute to test. However, the FIND command cannot tell if the programs were linked as AC(1). In some embodiments, BLDL can be used to help identify these programs. In some embodiments, USS syscalls for LOAD can be used in order to verify USS binaries are AC(1). The results are then saved to an USS output table. Once the appropriate output table has been created, batch jobs can be submitted using these tables. This is illustrated at step 220.

The testing of the programs begins by determining if any of the data in the parameter string 130 is being treated as a pointer instead of a character string. If so, it can be represented by a parameter list 140 instead. This is illustrated at step 230. Storage is obtained that will cause a protection exception when it is read or written. The contents of at least a portion of the parameter string 130 are then set to point to that storage. The rest of the parameter storage can be set to point to something else. For example, the rest of the parameter string 130 can contain expected constant values, pointers to data that does not cause a protection exception, or pointers to data that causes a protection exception at a specific address, different from the address range being tested. However, other pointers can be present. The storage can be initialized to expected values for easily repeatable results. If no protection exception occurs, the contents of the valid storage or pointers can be modified for different tests. If enough possible values for the parameter string 130 are exhausted, and no protection exception has occurred for the program being tested it can be determined that the program does not treat the data in the parameter string 130 as a pointer to an address used as a parameter by the authorized service. After testing a certain number of byte pieces of the parameter string 130, such as every four or eight bytes of the parameter string 130, the list of offsets in the parameter string 130 used as input to the authorized service can be correctly determined. Then the data that those parameters point to can be tested in a new round of testing and analysis. The process can be repeated as necessary or desired.

If, for example, an offset four is found to hold a parameter address because a protection exception occurred for the address supplied at offset four, the process attempts to determine what the area offset four points to. This is illustrated at step 240. For example, in a 32-bit addressing mode 100 bytes of storage can be obtained. This is enough storage for 25 parameters of 4 bytes each. However, other amounts of storage can be obtained. In a 64-bit addressing mode, 8-byte parameters can be used, instead, and additional amounts of storage can be obtained. Leaving the rest of the parameter string 130 constant all 25 parameters can be set to either contain constant values or pointers to valid storage locations. In later attempts these parameters can be varied. Then going one by one, one 4-byte piece of the parameter string 130 at a time is set to point to storage that will cause a protection exception. This is illustrated at step 250. When a protection exception occurs at that address after calling the authorized program with this parameter list 140 the process identifies that portion of the parameter string 130 as a parameter address in the parameter string 130. By having the process go through the full parameter string 130 with at least 25 potential parameters, one at a time, a list or map of which parameters contain addresses, and which likely do not is built. This is illustrated at step 260.

Once a list of offsets in the parameter string 130 is found that contains addresses of additional parameters, the map of the parameter list 140 and pointer contents discovered are used to test additional levels of parameters. This is illustrated at step 270. If the first parameter pointed to by the parameter string 130 contains a pointer to another parameter area because a protection exception occurred for the address supplied when supplied the address at that location, the process determines what the parameter area that the first parameter points to. Continuing with the 4-byte parameter example above, another 100 bytes of storage can be obtained. Again, this is enough for 25 parameters of 4 bytes each. As mentioned before other amounts of storage can be obtained. Leaving the values of the parameter string 130, now known as the first level parameter list 140, the process can set all 25 parameters in the second level parameter list 140 to contain constant values or point to valid or expected storage. The second level parameter list 140 is a parameter list 140 that is found at the location where the parameter in the first level parameter list 140 pointed to. In some embodiments the constants within the parameter can be varied. One by one, one 4-byte parameter at a time in the second level parameter list 140 can set to point to specific storage that will cause a protection exception. When a protection exception occurs at that address after calling the authorized program with this parameter list 140 the process identifies the parameter address in the second level parameter list 140 pointed to by the first level parameter list 140 in the parameter string 130. Going through the full list with 25 parameters one at a time a list or map of which parameters contain addresses is built for this level. This process can be repeated for as many levels of parameters as desired or for as many possible parameters that can be or are desired to be tested.

To prevent recursion due to linked lists of parameters, certain precautions can be implemented. In some embodiments, a maximum mapping depth can be established. For example, the process can be set to not map past the third level of a parameter list 140. To account for the fact that not all parameters are addresses, the process considers how changing a particular parameter in the parameter list 140 affects the results. Parameters that are not addresses in the parameter list 140 can include, for example, numeric function codes, bit strings, constants, key words, character strings, or other values. In one embodiment, the process determines that the parameter is an input but not a pointer is by trying different values for a parameter while keeping other values the same and determining if it affects the result. For example, in 32-bit addressing mode, if the parameter values '00000000'x, '00000001'x, '00000002'x, and '00000003'x all cause failures at different instruction addresses it is likely that parameter is a numeric function code or number. Conversely if, for example, parameter values of '80000000'x and '00000000'x cause predictable failures at two different addresses then it is likely the first bit in that parameter is a bit value that can be set to zero or one to request different processing. By, methodically testing each pointer, then each parameter, then each level of parameter list 140, for addresses, function codes, and bit values, the process can build a detailed map of a complex parameter list that can be used for testing.

The built maps are then provided for testing programs. This is illustrated at step 280. Authorized programs can be tested much more completely by using this information to supply complex valid parameters and one invalid or malicious parameter to expose security vulnerabilities by using program check error analysis.

One significant difference between testing AC(1) programs and testing Supervisor Calls (SVC) or program call (PC) routines is that AC(1) programs run with elevated privilege due to the JSCBAUTH bit being set. As a result, even if an AC(1) program is running in problem program state, not supervisor state, and with a user key, not system key, the program could still have a security vulnerability that compromises the system.

Figure 3:
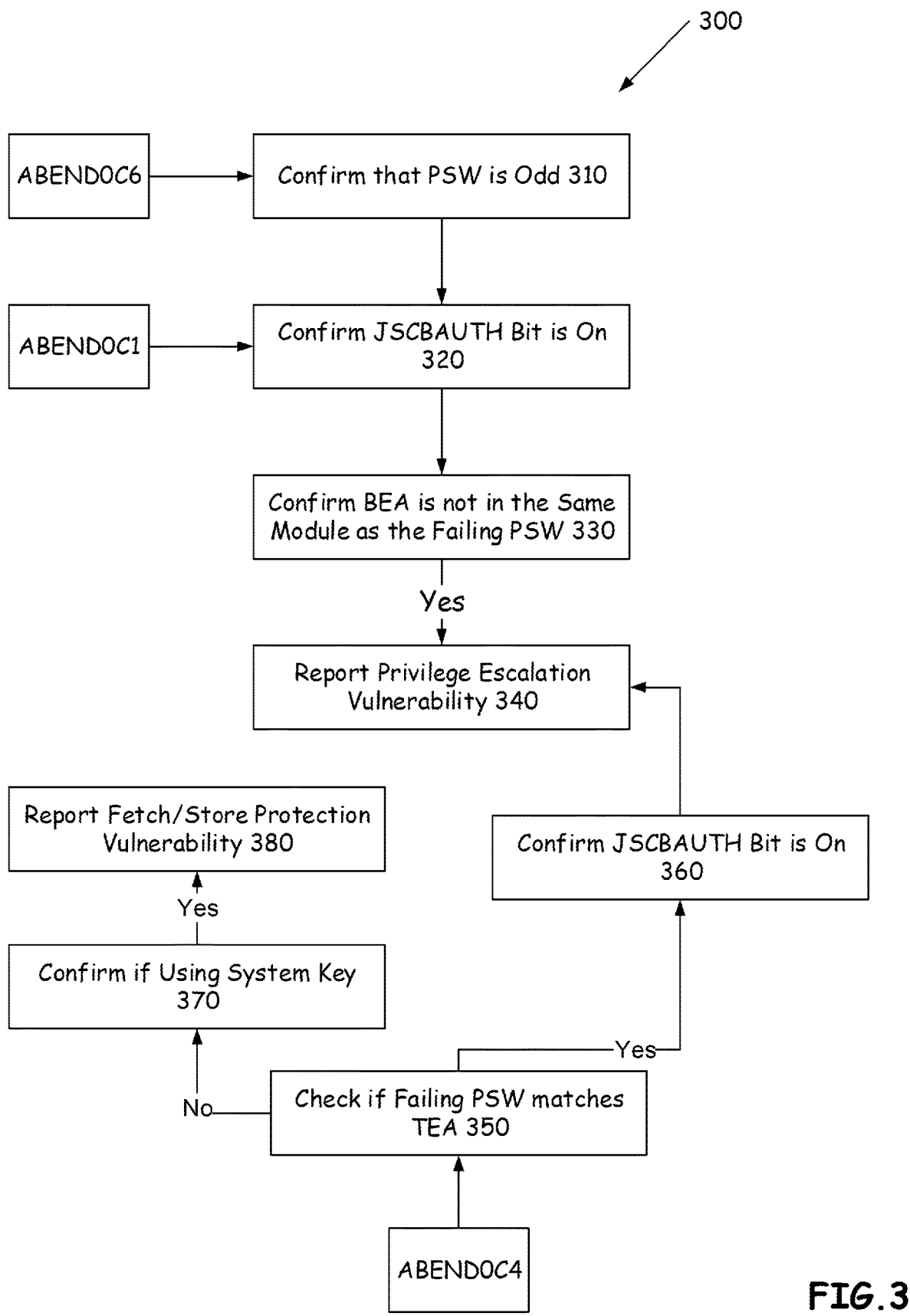
FIG. 3 is a flow diagram illustrating a process for detecting and analyzing vulnerabilities discovered according to various embodiments of the present disclosure.

FIG. 3 is a flow diagram that illustrates a process for identifying a vulnerability caused by an abend. Specifically, if an ABEND0C1, ABEND0C4, ABEND0C6, or related Language Environment abend is detected during dynamic testing that indicates a branch to an address the AC(1) program did not intend, the data at that address could be executed as code, under an APF authorized job step task. This means that code could take advantage of the ability to MODESET to supervisor state or system key even if it is not in those states already. This is a significant difference from how SVC or PC routines are tested, where such an error would only be a problem if already in system key or supervisor state at the time. Similarly the techniques for invoking an AC(1) program to test it are very different than how to call an SVC or PC for testing. Only an authorized program can attach another authorized program as a job step task so the programs being tested either need to be called from the EXEC statement in a batch job directly, or by having a test program attach them, in both cases with a bad parameter list. For USS the program can be spawned or forked and executed in order to run as an authorized program and job step task, with bad parameters. Then the tool can analyze the abends that occur as a result. Depending on the abend that occurs, process 300 shows a slightly different analysis occurs for each of these abends to identify a vulnerability. For ABEND0C6 the process begins by confirming if the program status word (PSW) is odd. An ABEND0C6 at an odd address indicates an error due to that address, valid instructions can only be at even addresses due to the underlying system architecture, while an ABEND0C6 at an even address indicates some other type of error and does not indicate a branch to an unexpected location. This is illustrated at step 310. If the PSW is odd, the process then confirms if the JSCBAUTH bit is still on. This is illustrated at step 320. For the ABEND0C1 analysis, the process starts at step 320. The analysis for ABEND0C1 and ABEND0C6 then continues along the same path. The process then confirms that the breaking event address (BEA) is not in the same module as the failing instruction address at the time of the error as shown in the failing PSW. If they are in the same module the error could be intentional to force an error and is therefore not likely to be an exploitable vulnerability. This is illustrated at step 330. If the address is not within the same module, a vulnerability due to privilege escalation is reported. This is illustrated at step 340.

For the ABEND0C4 analysis the process first determines if the failing PSW matches the translation exception address (TEA). This is illustrated at step 350. If the TEA and PSW match, the process then confirms if the JSCBAUTH bit is still on. This is illustrated at step 360. If the bit is still on a vulnerability due to privilege escalation is reported. This is illustrated at step 340. If the PSW and the TEA do not match, the process then determines if the ABEND0C4 is using a system key (0 to 7). This is illustrated at step 370. If it is using a system key, the process reports a vulnerability due to a store or fetch violation. This is illustrated at step 380.

Figure 4:
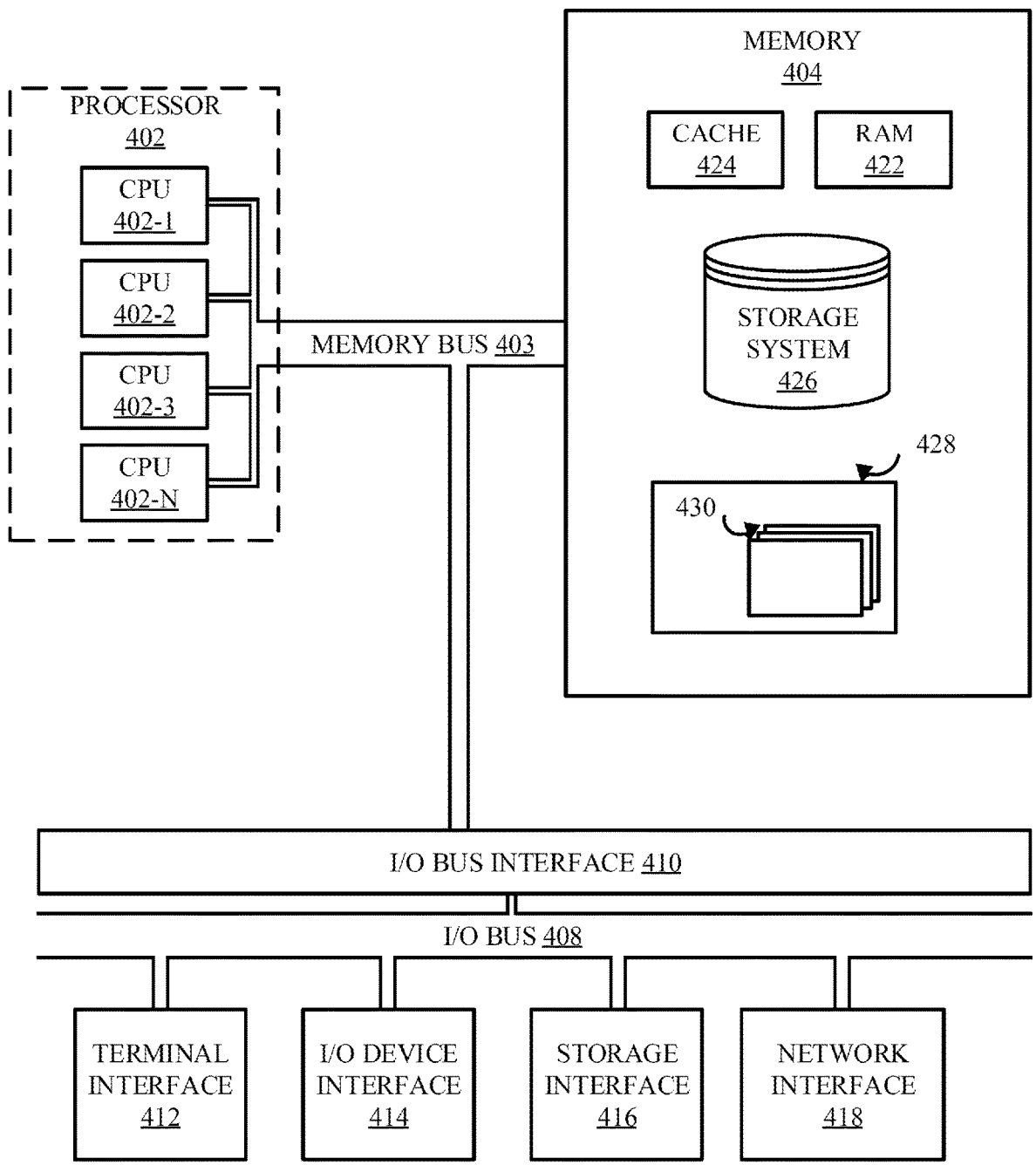
FIG. 4 is a block diagram illustrating a computing system according to one embodiment.

Referring now to FIG. 4, shown is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402-1, 402-2, 402-3, and 402-N, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 403 generally perform the functions or methodologies of various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
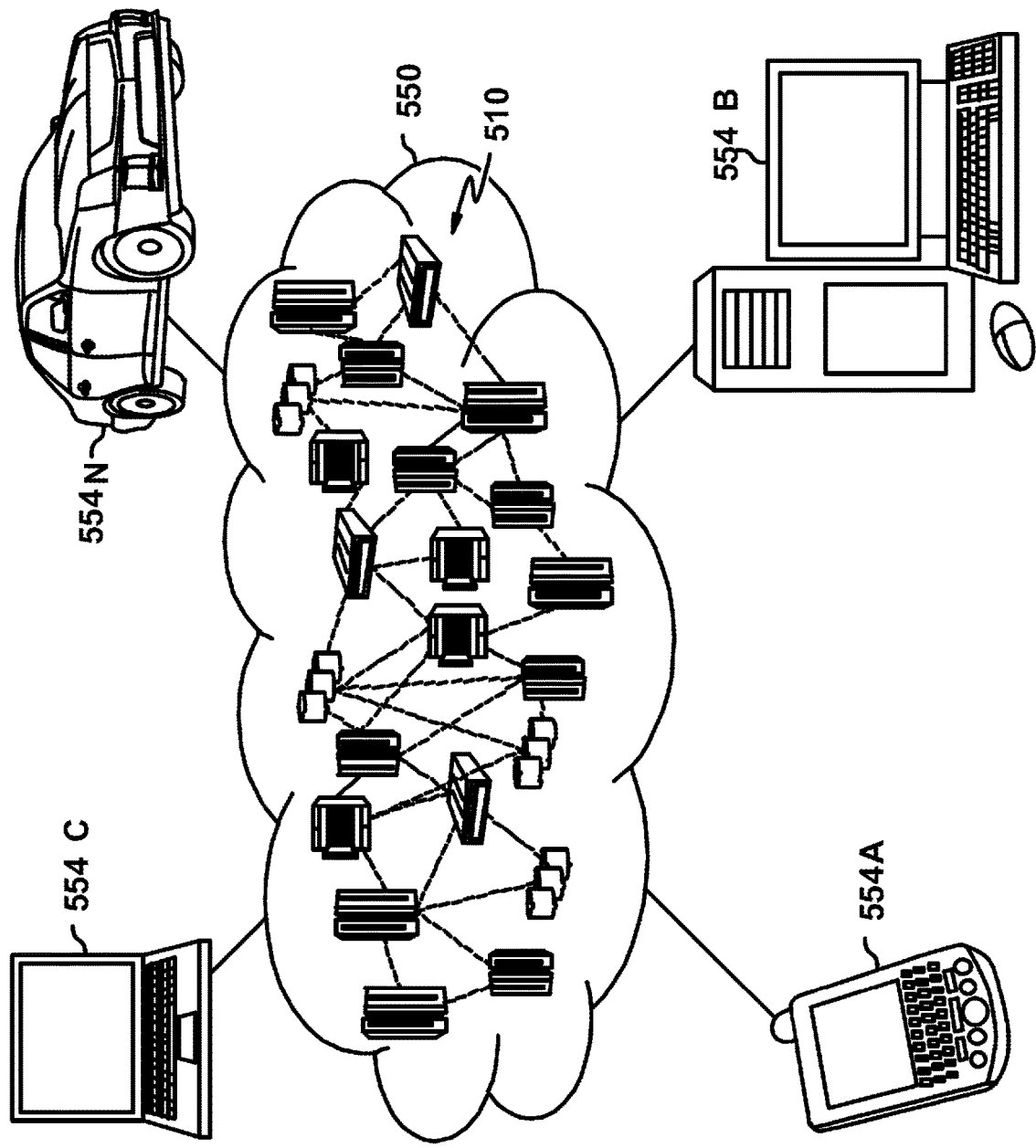
FIG. 5 is a diagrammatic representation of an illustrative cloud computing environment.

The system 600 may be employed in a cloud computing environment. FIG. 5, is a diagrammatic representation of an illustrative cloud computing environment 550 according to one embodiment. As shown, cloud computing environment 550 comprises one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 9Y may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 may communicate with any type of computerized device over any type of network and/or network addressable connection (e.g., using a web browser).

Figure 6:
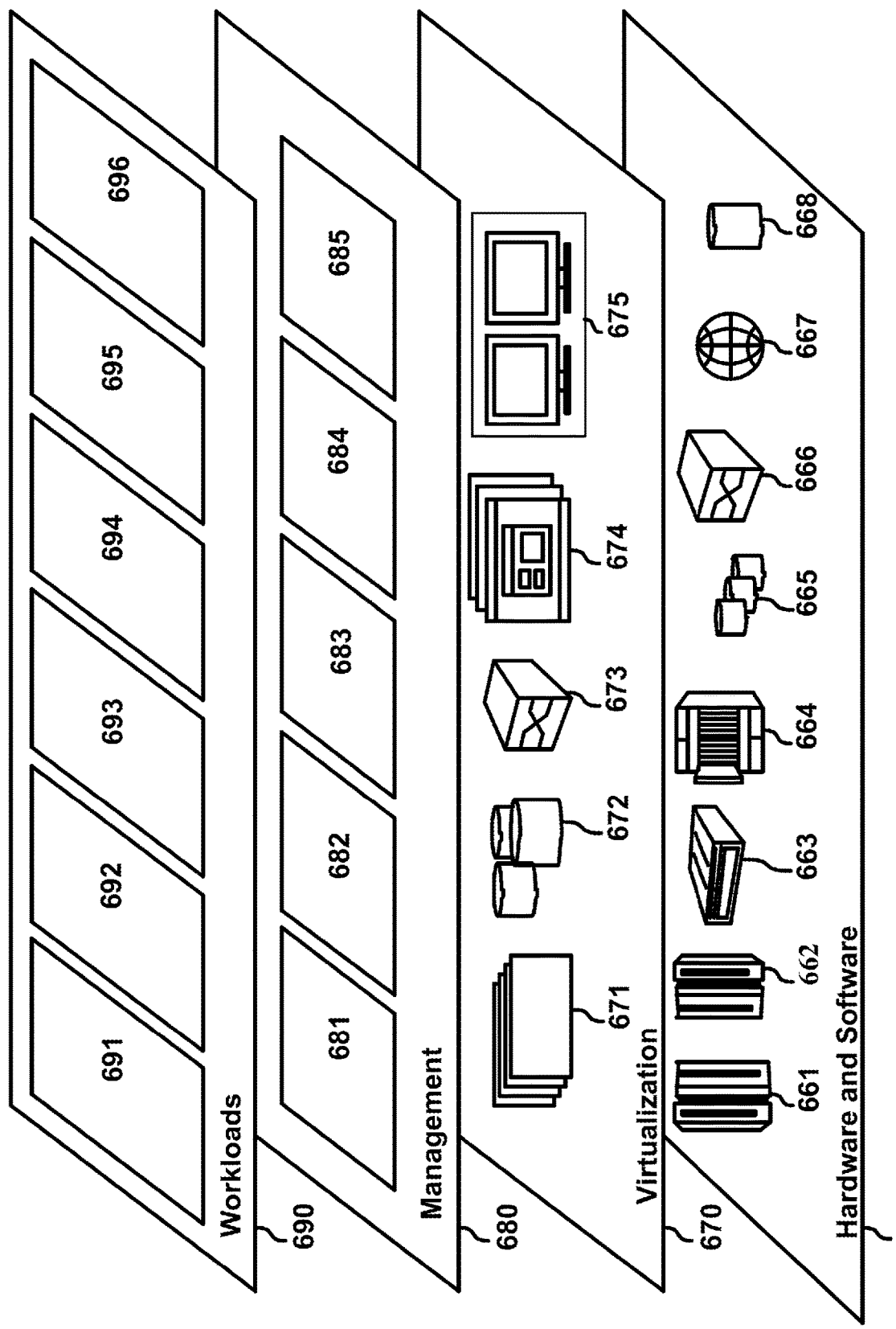
FIG. 6 illustrates a set of functional abstraction layers provided by cloud computing environment according to one illustrative embodiment.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; layout detection 693; data analytics processing 694; transaction processing 695; and database 696.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for identifying authorized job step programs, the method comprising:
   identifying a plurality of job step programs;
   identifying authorized program facility (APF) authorized programs from the plurality of job step programs;
   generating an output table of the APF authorized programs;
   submitting at least one batch job based upon the output table;
   generating a list identifying which parameters in a parameter string contain an address for respective ones of the APF authorized programs in the output table;
   providing the list for program testing;
   obtaining storage within a system, the storage configured to cause a protection exception;
   setting a portion of the parameter string to point to the storage; and
   setting a remainder of the parameter string to point to another location that does not cause a protection exception.

2. The method of claim 1, wherein the identifying the APF authorized programs further comprises:
   obtaining a list of APF data sets; and
   examining members of the APF data sets to determine which members of the APF data sets are linked with SETCODE AC(1).

3. The method of claim 2, wherein the generating the output table further comprises:
   saving results of the examination to the output table of the members that are linked with the SETCODE AC(1).

4. The method of claim 1, wherein the identifying the APF authorized programs further comprises:
   obtaining a list of programs with an APF attribute via a FIND command; and
   using a program to determine if a member of a data set is linked with SETCODE AC(1).

5. The method of claim 4, wherein the generating the output table further comprises:
   saving results of the used program to the output table when the member is linked with the SETCODE AC(1).

6. The method of claim 1, wherein the generating the list further comprises:
   determining if data in the parameter string is a pointer instead of a character string.

7. The method of claim 6,
   wherein the portion corresponds to a parameter in the parameter string.

8. The method of claim 6, further comprising:
   generating a list of offsets for the parameter string, wherein an offset is a byte piece of a predetermined number of bytes.

9. The method of claim 1, further comprising:
   calling the APF authorized programs using the parameter string having the portion of the parameter string pointing to the storage; and
   determining if the protection exception occurred following the calling.

10. The method of claim of claim 9, further comprising:
    identifying an offset position in the parameter string as a parameter address in response to the protection exception occurring, wherein an offset is a byte piece of a predetermined number of bytes within the parameter string.

11. The method of claim 9, further comprising:
    setting a second portion of the parameter string to point to the storage, wherein the second portion corresponds to a second parameter in the parameter string;
    setting the second portion of the parameter string to point to a location that does not cause the protection exception to create a second version of the parameter string;
    calling the APF authorized programs using the second version of the parameter string; and
    determining if the protection exception occurred following the calling using the second version of the parameter string.

12. The method of claim 11, further comprising:
    iteratively repeating the setting steps, the calling step and the determining step of claim 11 for a predetermined number of additional portions of the parameter string.

13. The method of claim 1, further comprising:
    obtaining a second amount of storage within the system, the second amount of storage configured to cause the protection exception when read from or written to;
    setting a portion of a second level parameter string to point to the second amount of storage, wherein the portion of the second level parameter string corresponds to a parameter in the second level parameter string; and
    setting a remainder of the second level parameter string to point to another location that does not cause the protection exception.

14. The method of claim 13, further comprising:
    calling the APF authorized programs using the parameter string having the portion of the parameter string pointing to the storage; and
    determining if the protection exception occurred following the calling.

15. A computer readable storage medium having computer executable instructions that when executed by one or more computers, causes the one or more computers to:
    identify a plurality of job step programs;

identify authorized program facility (APF) authorized programs from the plurality of job step programs;

generate an output table of the APF authorized programs;

submit at least one batch job based upon the output table;

generate a list identifying which parameters in a parameter string contain an address for respective ones of the APF authorized programs in the output table;

provide the list for program testing;

obtain storage within a system, the storage configured to cause a protection exception;

set a portion of the parameter string to point to the storage; and set a remainder of the parameter string to point to another location that does not cause a protection exception.

16. The computer readable storage medium of claim 15, further comprising instructions to:

determine if data in the parameter string is a pointer instead of a character string;

obtain storage within a system, the storage configured to cause a protection exception when read from or written to;

set a portion of the parameter string to point to the storage, wherein the portion corresponds to a parameter in the parameter string;

set a remainder of the parameter string to point to another location that does not cause a protection exception;

call the APF authorized programs using the parameter string having a portion of the parameter string pointing to the storage; and determine if the protection exception occurred following the call.

17. The computer readable storage medium of claim 16, further comprising instructions to:

identify an offset position in the parameter string as a parameter address in response to the protection exception occurring, wherein an offset is a byte piece of a predetermined number of bytes within the parameter string.

18. The computer readable storage medium of claim 16, further comprising instructions to:

set a second portion of the parameter string to point to the storage, wherein the second portion corresponds to a second parameter in the parameter string;

set the portion of the parameter string to point to a location that does not cause the protection exception to create a second version of the parameter string;

call the APF authorized programs using the second version of the parameter string; and determine if the protection exception occurred following the call using the second version of the parameter string.

19. The computer readable storage medium of claim 15, further comprising instructions to:

obtain a list of APF data sets; and examine members of the APF data sets to determine which members of the APF data sets are linked with SETCODE AC(1).

\* \* \* \* \*